DATA READING, RECORDING, AND POSITIONING SYSTEM

Filed Jan. 15, 1968

2 Sheets-Sheet 1

INVENTORS
DOUGLAS E. CLANCY
GEORGE W. HOBGOOD, JR.
FREDERICK T. MAY
BY John W Girvin, Jr
ATTORNEY United States Patent Office 3,530,448
Patented Sept. 22, 1970

3,530,448
DATA READING, RECORDING, AND POSITIONING SYSTEM

Douglas E. Clancy, George W. Hobgood, Jr., and Frederick T. May, Lexington, Ky., assignors to International Business Machines Corporation, Armonk, N.Y., a corporation of New York
Filed Jan. 15, 1968, Ser. No. 697,735
Int. Cl. G11b *5/06, 5/48, 15/20*
U.S. Cl. 340—174.1 6 Claims

ABSTRACT OF THE DISCLOSURE

An information recording system for recording quanta of data information on a medium which is adapted for relative motion with recording means wherein sensing means are spaced a fixed distance from the recording means to sense each successive quantum of data information to thereby control the placement for recording of a following quantum of data information on the medium at the distance approximately equal to the distance between the sensing means and the recording means. Additionally, each recorded quantum of data information is utilized to control the relative position of the recording means and the medium for error checking and then to control the relative position of the medium and the recording means for initiation of a subsequent recording cycle.

CROSS REFERENCES TO RELATED APPLICATIONS

The following applications are all assigned to the same assignee as the present application.

U.S. patent application Ser. No. 697,716 now Pat. No. 3,484,749, entitled "Recording and Playback System Incorporating a First Character Positioning System," Donald J. Morrison and Howard C. Tanner, inventors, filed 1968 concurrently herewith.

U.S. patent application Ser. No. 697,717 entitled "Detection and Error Checking System for Binary Data," Cecil Wayne Cox and Frederick T. May, inventors, filed 1968 currently herewith.

U.S. patent application Ser. No. 623,053, filed Mar. 14, 1967, now abandoned, entitled "Data System With Printing, Composing, Communications, and Magnetic Card Processing Facilities," Robert A. Kolpek, inventor.

U.S. patent application Ser. No. 623,022, filed Mar. 14, 1967, entitled "Correlated Recording, Reproducing, Printing and Composing Apparatus," John E. Jones, Robert A. Kolpek and Robert A. Rahenkamp, inventors.

BRIEF BACKGROUND OF THE INVENTION

Field

The present invention relates to information recording and playback systems wherein data characters are stored on a medium in a machine recognizable form and, more particularly, to a recording and playback system which accurately positions each character recorded relative to each previous character recorded. The system is particularly adapted to cooperate with a serial entry device such as a typewriter keyboard.

DESCRIPTION OF THE PRIOR ART

Prior art information recording systems fall into two general categories, clocked and self-clocking. An example of a clocked recording system is one wherein timing information is previously recorded on the medium and utilized to control the positioning of data characters recorded on the medium. In some clocked systems, an emitter coupled to the medium drive supplies the necessary timing signals. The utilization of the emitter does away with the obvious inconvenience of prerecording a timing track, but also introduces error tolerances which must be compensated for due to medium slippage and media expansion and contraction. In each such clocked system, clocking signals generated independently of the data signals are utilized to correctly position of the recorded data. Generally, once the information is recorded in such a fixed spacial relationship, the clocking signal derived from either the medium or from the emitter is utilized to gate out the information during playback, thereby aiding in rejecting spurious noise signals by separating the data signals from the noise signals.

A second prior art approach has been to self-clock the data onto the medium. An example of such a system is one wherein each unit of data information to be recorded is prefixed by a prelude pattern. Each binary information bit thereafter recorded, is recorded a fixed time after the preceding information bit. By the utilization of phase or frequency data encoding, the information bits themselves can be sensed to supply a clock signal during playback. The prelude pattern is sensed to properly synchronize the self clock and thereafter each data character sensed resynchronizes the clock. Another self clocking approach is to generate a clocking signal simultaneously with the data signals and record it on a separate timing track. During playback, the timing track is utilized to gate out the data signals. It is to be noted that all self-clocking systems record signals that are separated a fixed time distance from one another, but may vary as to their relative positions on the medium due to velocity variations in the moving medium. Elaborate schemes have been devised to compensate for slight medium velocity variations which occur by resynchronizing clocks, redundancy bit coding, and dual level sensing of the signals. However, none of the self-clocking systems have attempted to assure exact positioning of the data recorded.

An additional prior art approach utilized to position large blocks of data has been to record an interblock signal on a separate timing track. Sensing of this signal indicates to the system that a block of information may thereafter be recorded without interfering with the previous block of information. This signal is thus utilized to position blocks of information relative to one another. However, it is to be noted that velocity variations are not compensated for since once the signal has been sensed, the block of information is recorded at a fixed time thereafter.

Utilizing prior art systems, when it is necessary to change the recorded information, for example, to correct errors, it has been necessary to rerecord entire blocks of information to correct one error character that may exist within the information block or to utilize information recorded on a separate timing track to access and rerecord particular characters within a group of characters. While the former approach is efficient for large scale data processing machines which are capable of retaining vast quantities of data in fixed storage, it is extremely inefficient for use in conjunction with a serial entry device, such as a typewriter keyboard, wherein the rerecording of an entire block of information would entail rekeyboarding the entire block of information. Additionally, the utilization of a timing track to position data as suggested by the prior art necessarily involves the construction of separate sensing means to sense the timing signals and special circuitry responsive to the timing signals to properly access and record information in the data tracks. Further, when it is desired to correct errors on the medium which have been recorded on one such device by utilizing another device of similar construction, it is necessary to insure that the response to the medium timing track by all such devices manufactured is practically identical. Thus, it is necessary to supply tuning circuits so that medium recorded on one machine is compatible for utilization with another. Therefore, the utilization of separate timing tracks on the medium adds greatly to the cost and complexity of the overall recording system.

SUMMARY

In order to overcome the above problems of the prior art and to provide a recording system wherein the position of successive characters relative to one another is precisely regulated without the utilization of a timing track, the recording system of the present invention is provided with a unique position detection scheme which detects the physical position of the previously recorded character and places the character to be recorded at a position dependent thereon.

The data positioning system is provided with a read head which is spaced a predetermined and exact distance from the write head. When the read head senses a previously recorded character, the write head is gated by exclusive gating means and the next following character is recorded. After this character has been recorded, the medium is positioned relative to the read head so that the character will be sensed on the next subsequent character record cycle to correctly position the next following character. If it is desired to correct a character, the medium is positioned so that the character preceding the character to be corrected is placed in proximity to the read head. Thereafter, during the record cycle, sensing of the preceding character by the read head causes the character to be corrected to be replaced by the correct character in the exact position in which it was previously recorded.

Since the intergap distance can be closely controlled for each machine thus constructed, media can be recorded on one machine and corrected on another without necessitatinng expensive timing systems.

An additional feature of the present invention is the utilization of the data character to correctly position the medium for error detection in an incremental recording system and then to reposition the medium for a subsequent record cycle.

The foregoing and other features and advantages of the invention will be apparent from the following more particular description of the preferred embodiment of the invention as illustrated in the accompanying drawings.

Figure 1:
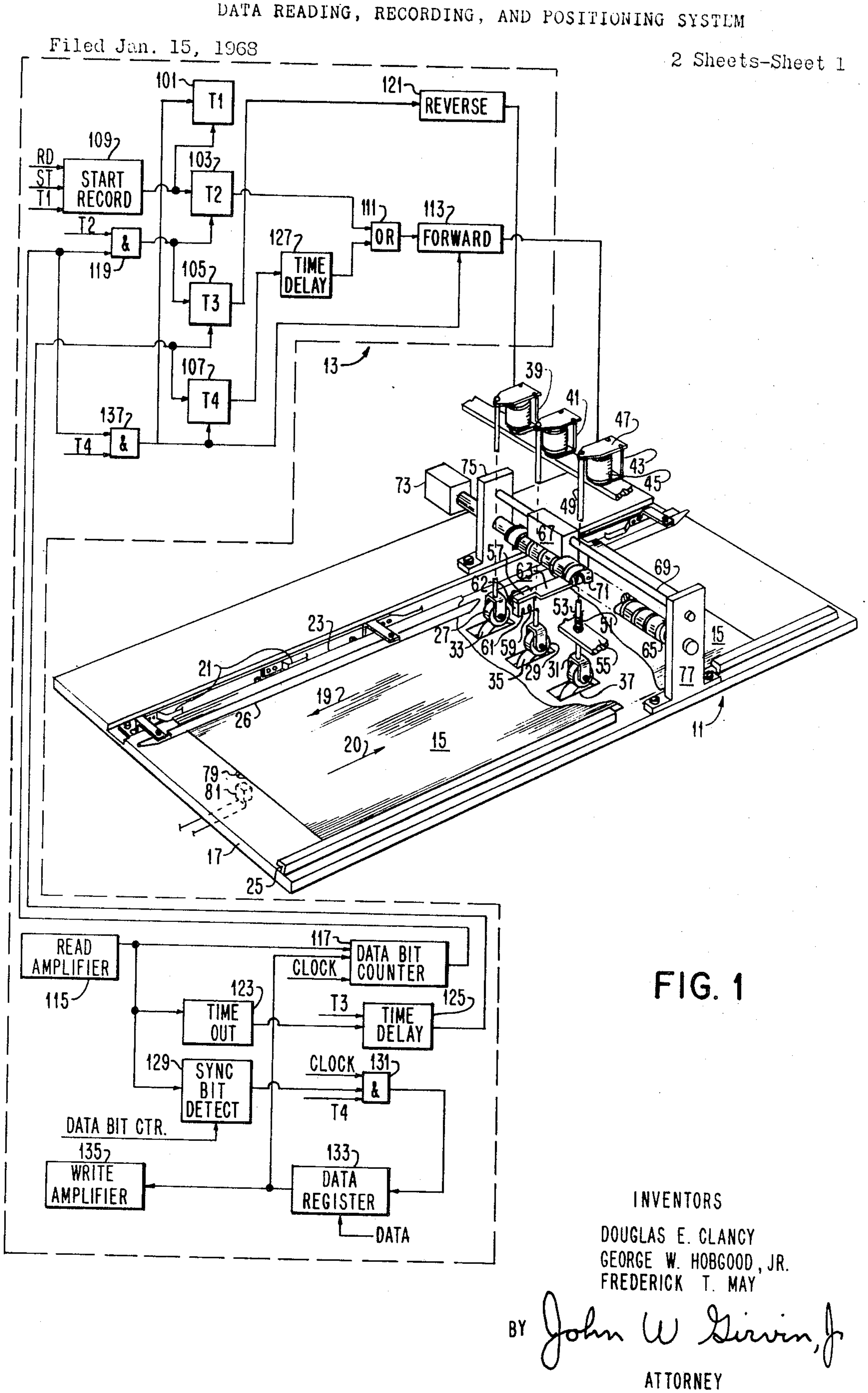
FIG. 1 is a schematic diagram of the mechanical drive and the recording system logic of the present invention.

Referring now to FIG. 1, a schematic diagram of the mechanical drive and the recording system logic of the present invention is depicted. It consists of a magnetic card transport and recording device 11 and electronic logic 13. The magnetic card transport and recording device is depicted schematically and is similar to one described in detail in the aforereferenced U.S. patent applications 623,053 and 623,022 incorporated by reference herein. The electronic logic 13 is responsive to signals recorded on magnetic card medium 15 to generate signals to control the motion of the magnetic card medium and to control the recording of data information on the medium.

The magnetic card transport device comprises a bed plate 17 over which the magnetic card medium 15 moves in the direction of arrows 19 and 20. Leaf springs 21 are mounted to the bed plate 17 and act against edge 23 of the magnetic card medium to force it against guide slot 25 thereby preventing lateral motion of the card. Guide 26 under which the card is placed acts to insure that the card maintains contact with the leaf springs 21. Idler wheels 27, 29, and 31 are selectively energized to force the magnetic card medium 15 against continuously rotating drive rollers 33, 35, and 37 respectively, to thereby impart motion in the direction of arrows 19 to 20 to the magnetic card medium. Drive roller 37 rotates in a clockwise direction as viewed about its axis thereby tending to move the magnetic card medium in the direction of arrow 20, drive roll 33 rotates in a counterclockwise direction as viewed about its axis, thereby tending to impart motion in the direction of arrow 19 to the magnetic card medium 15 and drive roll 35 also rotates in a counterclockwise direction at a relatively greater velocity than drive roll 33. The drive rolls 33, 35, and 37 are mechanically coupled to a fly wheel (not shown) which imparts inertia to the system thereby keeping the peripheral velocity of the drive rollers relatively constant under load and no-load conditions. This system is described in greater detail in the aforementioned application of Robert A. Kolpek, Ser. No. 623,053.

As described above, idler wheels 27, 29, and 31 are selectively actuatable to engage corresponding drive rollers 33, 35, and 37 respectively. Magnet and armature assemblies 39, 41, and 43 receive electrical impulses from the electronic logic 13 and effect movement of their corresponding idler wheels 27, 29, and 31 respectively against the magnetic card medium 15. For example, when it is desired to move the magnetic card medium 15 in the forward direction of arrow 20, a signal is applied to the coil 45 of the magnet and armature assembly 43 thereby causing the armature 47 to move in a downward direction toward the coil. The movement of the armature 47 in a downward direction causes a corresponding downward motion of shaft 49 which is attached to the armature 47 and to the idler wheel 31, thereby causing the idler wheel to engage the magnetic card medium 15 and drive it against continuously rotating drive roller 37. The card remains thus engaged with the drive roller until the signal applied to coil 45 is removed. Return spring 51 is wrapped about shaft 49 and engages shaft pin 53 at one end thereof, and the frame member 55 at its opposite end. The spring is compressed and tends to cause the shaft 49 to move in an upward direction. Thus, when the signal is removed from coil 45, the return spring 51 effects upward motion of shaft 49, thereby disengaging the idler wheel 31 from the magnetic card medium 15. The magnet and armature assemblies 39 and 41 coact with their corresponding idler wheels 27 and 29 in an identical manner to that described above with respect magnet and armature assembly 43 and idler wheel 31. The magnetic signals are recorded on and sensed from the magnetic card medium 15 by the magnetic head assembly 57 (shown enlarged). The magnetic head assembly 57 is depicted as a two-gap magnetic head having a read gap 59 and a write gap 61. Thus, as the magnetic card medium moves in the direction of arrow 20, it passes under write gap 61 and then under read gap 59. The magnetic head assembly 57 is mounted to member 63 which is oriented parallel to the motion of the magnetic card medium 15. Thus, the data that is recorded by the magnetic head assembly 57 is recorded along a track parallel to the edge 23 of the magnetic card medium 15. Both the read gap 59 and the write gap 61 as skewed at an approximate angle of 7° with respect to the edge 62 of the magnetic head assembly 57 which is perpendicular to the direction of motion.

In order to record a plurality of tracks of information parallel to the direction of motion of the magnetic card medium 15, the magnetic head assembly 57 and member 63 are movable in a direction perpendicular to the motion. This movement is effected by the rotation of lead screw 65 which causes lead screw follower 67 to move along guide rod 69. Movement of the lead screw follower 67 along guide rod 69 causes corresponding motion of pivot assembly 71 and member 63 which is mounted to the pivot assembly, thereby effectuating movement of the magnetic head assembly 57 in a direction perpendicular to the motion of the magnetic card medium 15. Pivot assembly 71 insures intimate contact of the magnetic head assembly 57 with the magnetic card medium 15. Clutch assembly 73 is selectively operable to connect the lead screw 65 to drive means (not shown) and thereby effect rotation of the lead screw 65 in one of two selectable directions. The lead screw assembly 65 and guide rod 69 are supported by members 75 and 77 which are fixedly mounted to the bed plate 17.

Initially, when the magnetic card medium 15 is inserted into the magnetic card transport and recording device 11, a card detection switch (not shown) is transferred causing a signal to appear at the coil of magnet and armature assembly 41. This causes high speed card motion in the direction of arrow 19. Idler wheel 29 remains engaged with the magnetic card medium 15 until the card arrives at the position shown. At this point, the magnetic card medium 15 partially covers hole 79, thereby causing light-sensitive device 81 to generate a signal. This signal is applied to electronic logic (not shown) which removes the signal from the coil of the magnet and armature assembly 41, thereby enabling the card to come to rest.

The preceding description describes how the magnetic card medium 15 is selectively moved either in the direction of arrow 19 or arrow 20 along the bed plate 17 and under the magnetic recording head assembly 57. Additionally, it has been described how the magnetic head assembly 57 is movable in a direction perpendicular to the direction of motion of the magnetic card medium 15. In the description which immediately follows, the electronic logic which effectuates the recording and playback of information on the magnetic medium 15 by the magnetic head assembly 57 and the electronic logic which effectuates card motion in conjunction with the recording and playback of information is described.

Prior to entering a detailed description of the function of each logic block of electronic logic 13, the following brief description will describe the overall function of the logic in effecting a recording cycle. Each recording cycle consists of recording a predetermined quantum of information on the magnetic card medium and checking the information thus recorded to insure that it was recorded correctly. In the description which follows, it will be assumed that the quantum of information desired to be recorded are the number of binary bits necessary to represent an information character in a predetermined code. During a recording cycle, the card medium 15 is incremented in a forward direction in the direction of arrow 20. During this motion, a character previously recorded on the magnetic card medium 15 at write gap 61 is caused to pass under read gap 59 of the magnetic head assembly 57. The character thus previously recorded is sensed to insure that it was properly recorded during this portion of the record cycle. The card is then incremented in the reverse direction of arrow 19 to its approximate initial position at the start of the recording cycle. Thereafter, the magnetic card medium 15 is once again incremented in the forward direction of arrow 20. When a signal indicating that the previously recorded character is passing under read gap 59 is sensed, the character to be recorded is electronically transmitted to the magnetic head assembly 57 and recorded at the write gap 61 in a well known manner. Once this character has been recorded, motion of the magnetic card medium 15 in the forward direction of arrow 20 ceases, and the magnetic card medium is then in a position relative to the magnetic head assembly for the next recording cycle.

Thus, as described above, the recording system may assume one of four subcycle states: rest, forward motion for error checking, reverse motion, and forward motion for data recording.

Referring now to the logic blocks depicted generally within electronic logic 13, status latch circuits 101, 103, 105, and 107 provide output signals to control the subcycle of operation during a record cycle. Each of these latch circuits are set by a signal applied to the lead on the left-hand side of the logic block and reset by a signal applied to the lead connected to the under side of the logic block. The $T_1$ status latch circuit 101 provides a signal to indicate that the system is in a rest position. When a character record cycle is initiated, a start signal is applied to start record logic 109. This signal could be generated upon the depression of a key on a keyboard entry device. Assuming the system to be at rest and in the record mode, the start record logic 109 provides an output signal which resets the $T_1$ status latch circuit 101 and sets the $T_2$ status latch circuit 103. This in turn effects a signal at the output of the $T_2$ status latch circuit 103 which is applied to OR circuit 111 and thence to forward control circuit 113. The forward control circuit 113 generates an electrical signal which is applied to coil 45 of magnet and armature assembly 43, thereby effecting forward motion of the magnetic card medium 15 in the direction of arrow 20. This drive motion continues until the $T_2$ status latch circuit 103 is reset.

Since it is desired to check the previously recorded character for error during the forward motion of the magnetic card medium 15, it is necessary that status latch circuit 103 not be reset until after the entire character has been read for checking purposes by the error detection circuitry. As noted above, as the magnetic card medium 15 moves in the direction of arrow 20 under the read gap 59, characters which have previously been recorded by the write gap 61 may be checked for error detection. Thus, the magnetic signals of the previously recorded character induce an electrical signal into the reading coil (not shown) of the magnetic head assembly in a well known manner as the magnetic signals pass under read gap 59. These signals are sensed and shaped by read amplifier circuit 115 and are applied to data bit counter 117. A clock pulse derived from the data bits themselves gates each data bit detected into the data bit counter 117. Once the data bit counter 117 has counted all of the data bits comprising a character, it generates an output signal which is applied to AND circuit 119. In the event that no previously recorded character is sensed, or in the event that only a partial character is sensed, a time out circuit (not shown) provides an output signal which indicates error and which resets the forward control circuit. Additionally, the signals detected by the read amplifier 115 are also applied to error detection logic (not shown). A more detailed description of the data bit recording, checking, and clocking circuitry is described in the aforereferenced application of Cecil Wayne Cox and Frederick T. May filed concurrently herewith.

Once all of the data bits comprising a character have been sensed, it is no longer necessary to drive the card medium in a forward direction, and, therefore, the signal output of the data bit counter 117 applied to AND circuit 119 is effective to reset the $T_2$ status latch circuit 103 and set the $T_3$ status latch circuit 105. Resetting of the $T_2$ status latch circuit effects the removal of the forward drive from the magnetic card media 15. When the $T_3$ status latch circuit 105 is set, it supplies an output signal to the reverse control 121 which energizes the coil of magnet and armature assembly 39, thereby effecting movement of the magnetic card media 15 in the reverse direction of arrow 19. Movement in this direction continues until the entire previously recorded character passes under read gap 59. As the previously recorded character thus passes under the read gap in the reverse direction, data bit signals are generated and shaped by read amplifier 115 and applied to time-out circuit 123. The first such data bit signal received sets the time-out circuit. Each data bit signal sensed thereafter causes the time-out out circuit to remain set. If, however, no data bit signals are detected in a predetermined time interval, time-out circuit 123 resets and provides a signal to time delay circuit 125. Providing that $T_3$ status latch circuit 105 is set, the output signal of the time-out circuit 123 is delayed by time delay circuit 125 and then applied to reset the $T_3$ status latch circuit 105 and to set the $T_4$ status latch circuit 107. The time delay assures that the magnetic card medium 15 is moved a sufficient distance to insure that the entire character which was previously recorded will be sensed by the read gap 59 on the next subsequent forward motion cycle. The resetting of the $T_3$ status latch circuit 103 immediately causes the reverse motion of the card to cease. However, the subsequent forward motion of the magnetic card medium 15 is delayed since the signal output of the $T_4$ status latch circuit 107 is applied to time delay circuit 127. This delayed signal is then applied to OR circuit 111 and to forward control 113 to effect forward movement of the magnetic card medium 15 in the direction of arrow 20.

In order to control the precise positioning of the character to be recorded with respect to the previously recorded character, a selected data bit hereinafter termed the sync bit of the previously recorded character is detected at the output of the read amplifier 115 by the sync bit detection circuitry 129. The sync bit could be the first data bit recorded of the preceding character or any other data bit of that character. Detection of the sync bit by the sync bit detection circuitry 129 causes an output signal to be generated which is applied to AND circuit 131. A clock input and the output signal of the $T_4$ status latch cricuit 107 is also applied to AND circuit 131 whose output causes the binary data representative of the character to be recorded to be gated serially from the data register 133 to the write amplifier circuit 135. Thus, with each clock pulse received, an additional bit of data is gated out to the write amplifier circuit 135. The output signal from the write amplifier circuit 135 applied to the recording coil (not shown) of the magnetic head assembly. As each data bit is gated from the data register 133 to the write amplifier 135, it is also applied to data bit counter 117. Once an entire character has thus been gated out of the data register 133, the data bit counter 117 provides a signal to AND circuit 137 which in turn provides an output signal to reset the $T_4$ status latch circuit 107 and to set the $T_1$ status latch circuit 101. This signal is also applied to the forward control circuit 113 to prevent the delayed output signal of the $T_4$ status control circuit 107 from controlling the current to coil 45 of magnet and armature assembly 47 and thereby effectuating immediate release of the idler wheel 31 from the magnetic card medium 15. At this time, the system is adapted to receive the next input data character, and each successive recording cycle thereafter is identical to the one previously described above.

It is to be noted that when the first character on a track is to be recorded, there is no previous character on which to sync in order to position the first such character to be recorded. In this instance, a syncing signal may be derived from the output of the light sensitive device 81 or from a reference character previously recorded. The recording of this reference character is described in the aforereferenced application of Donald J. Morrison and Howard C. Tanner, filed concurrently herewith. It should be noted further that current is continuously supplied to the write coil of the magnetic head assembly 57. Thus, when characters are not being gated from the data register 133 and when the magnetic card medium is moving in the direction of arrows 19 or 20, erase current is applied to the medium thereby assuring that the area of the medium which will receive the character to be recorded contains no spurious information from previous utilization of the medium.

Figure 2:
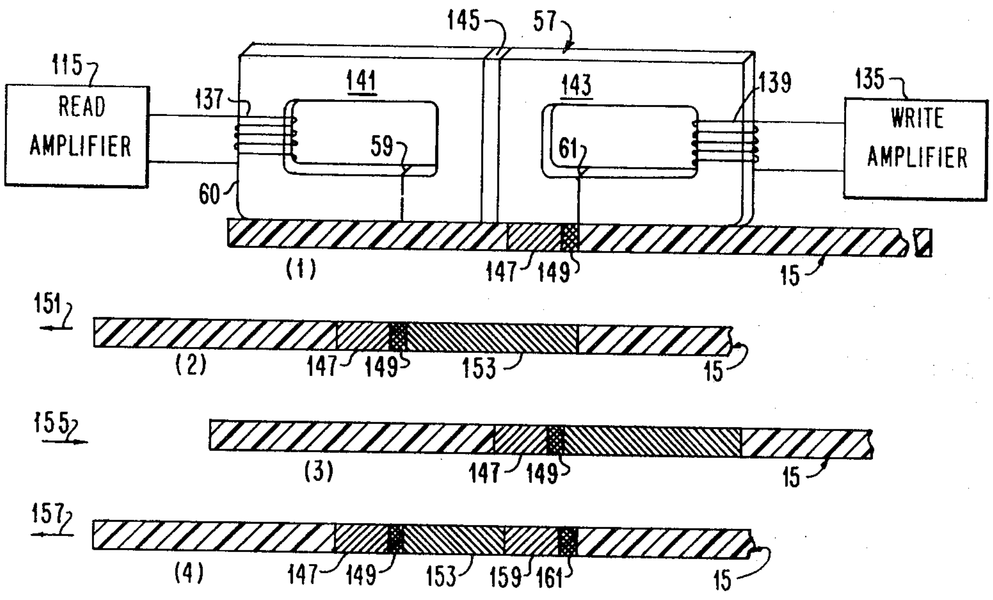
FIG. 2 is a schematic diagram of the recording head and the medium in various relative positions.

Referring now to FIG. 2 of the drawings, the magnetic card medium 15 is depicted in various relative positions with respect to the magnetic recording head 57. The four positions of the medium depicted correspond to the four subcycles of a recording cycle as described above. The magnetic head assembly 57 has attached thereto a read coil 137 and a write coil 139. The magnetic head assembly comprises a read head 141, a write head 143, and nonmagnetic separator material 145. The nonmagnetic separator material 145 reduces the transformer action between the read head 141 and the write head 143. The read head has associated therewith a read gap 59 and the write head 143 has associated therewith a write gap 61. These gaps are skewed at an angle of 7° with respect to edge 60.

As the magnetic medium 15 moves under the write gap 61, a signal is impressed thereon in accordance with direction of current flow through write coil 139. In a similar manner, when the magnetic medium passes under read gap 59, it induces a current flow in read coil 137, the direction of current flow being dependent upon the orientation of the magnetic signals recorded on the magnetic medium.

In FIG. 2, the medium is depicted in four relative positions 1, 2, 3, and 4 with respect to the magnetic head assembly 57 which correspond to the four subcycles of the record cycle described above with respect to FIG. 1. In the description which follows, it will be assumed that a character 147 has been previously recorded. As noted above, each character consists of a plurality of binary bits, with each binary bit being represented by a magnetic flux reversal in accordance with the well known phase encoding techniques which are described in detail in the aforereferenced patent application of Cecil Wayne Cox and Frederick T. May filed concurrently herewith. As also noted above, when the write amplifier 135 is not supplying data information, current is continuously applied in a predetermined direction to write coil 139. This causes the magnetic medium passing thereunder to assume a given flux state, hereinafter called the "zero" flux state. That area of the magnetic card medium 15 which is thus put in the "zero" flux state is said to have been "erased." Since the magnetic card medium does not come to an instantaneous stop upon the recording of the last data bit of a character, a small area of the magnetic card medium following the data bit passes under the write gap 61 prior to the card coming to rest. This area 149 is thus erased.

Thus, in its rest position, prior to a recording cycle, the relative position of the magnetic card medium 15 to the magnetic head assembly 57 is depicted at 1, with the previously recorded character 147 and a small erased area 149 having passed under the write gap 61. Upon initiation of the record cycle, the magnetic card medium 15 is moved in a forward direction in the direction of arrow 151 so that the previously recorded character 147 may be checked for error. As the magnetic card medium moves in the direction of arrow 151, the previously recorded character 147 passes under read gap 59 of the magnetic head assembly 57 thereby inducing a current in the read coil 137 which is applied to the read amplifier 115. The current induced is representative of the character previously recorded and the information derived therefrom is checked to insure that the character was properly recorded. As the magnetic card medium moves in the direction of arrow 151, that portion 153 of the medium which passes under write gap 61 is erased, thereby insuring that no spurious information signal from previous utilizations of the medium are present. It is within this portion 153 of the medium that the next data character to be recorded will be recorded.

During the next subcycle of the record cycle, the magnetic card medium 15 is moved in the reverse direction of arrow 155 so that it assumes its approximate initial position. It is to be noted that care must be taken so that character 147 not pass under write gap 61 since the current being applied to the write gap 61 would erase this character. However, it is also necessary that the character 147 be moved an appreciable distance behind the read gap 59 to thereby assure that the medium will be travelling at a constant velocity when it next appears under the read gap 59 during the subsequent subcycle.

During the fourth subcycle, the medium is moved again in the forward direction of arrow 157. Once the sync bit of character 147 passes under read gap 59 and is detected by the logic circuitry shown in FIG. 1, information signals representative of the character to be recorded are applied to the write amplifier 135 and then to the write coil 139. The application of data signals to the write coil 139 effects the recording of a character 159 over a portion of the medium 153 which has previously been erased. Once the entire character is thus recorded, the driving force is removed from the medium and it coasts to a stop. Area 161, which passes under the write gap when no data signals are being recorded as the medium is coasting to a stop, becomes erased as described above with respect to area 149. In the position shown at 4, the medium is in a position for the next subsequent recording cycle.

Figure 3:
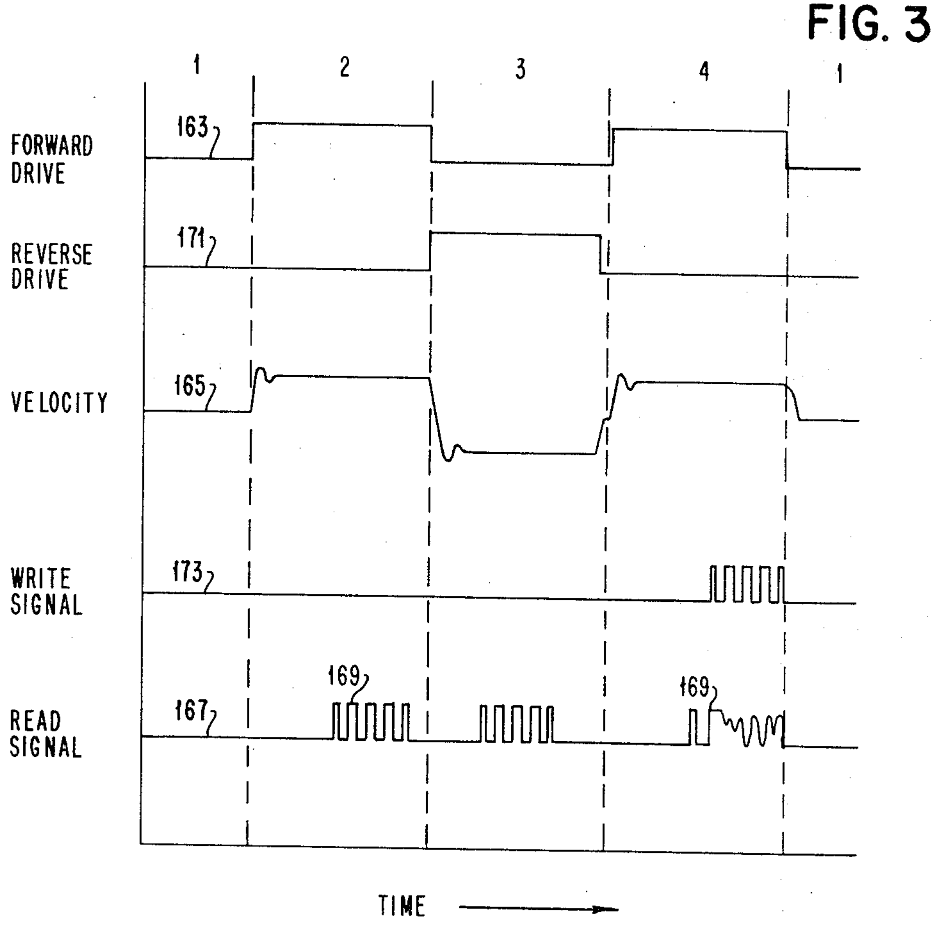
FIG. 3 is a timing diagram of various signals generated by the recording system shown in FIG. 1.

Referring now to FIG. 3, a timing diagram is shown depicting the application of the drive signals, the velocity of the magnetic card medium, and the signals sensed from and recorded on the magnetic card medium. The timing signals are depicted as falling within four time zones labeled 1, 2, 3 and 4 which correspond to the four subcycles of the recording cycle. As described above, during subcycle 1, the medium is in its rest position. During subcycle 2, a pulse is applied to the forward drive magnet causing the medium to move in a forward direction. This is depicted as the forward drive signal 163 of FIG. 3. In its rest position, the card, of course, has zero velocity. Upon the application of the driving force to the magnetic card medium, the card medium accelerates in a forward direction and obtains a constant velocity. It has been found with the drive system utilized that a velocity of five inches per second may be readily obtained within .015 inch of card motion. This is depicted by the velocity curve 165. Since the data of the previously recorded character is sensed during the second subcycle, data pulses appear on read signal 167. This read signal is representative of the output supplied by the read amplifier described with respect to FIGS. 1 and 2. In the phase encoded data system utilized, seven data bits are recorded which are preceded and followed by corrective flux reversals. The first data bit 169 is utilized as the sync bit as will be described hereinafter.

At the start of the third subcycle of the record cycle, signal 171 becomes positive and is applied to the reverse drive magnet and armature assembly of FIG. 1 thereby effectuating movement of the magnetic card medium in the reverse direction. The card velocity as depicted by velocity curve 165 decelerates from its five-inch per second constant velocity effected under the force of the forward drive mechanism through zero velocity until a constant velocity of five inches per second in the reverse direction is achieved. As the card moves in the reverse direction, the previously recorded character once again passes the read gap of the magnetic head assembly which causes it to be read in reverse. Thus, read signal 167 fluctuates in accordance with data signals recorded on the medium as the medium traverses the read gap in the reverse direction. Once the circuitry described in FIG. 1 detects from the read signal that the entire data character has been read in the reverse direction, and after a predetermined time delay, the reverse drive signal 171 goes down thereby causing the card to decelerate to zero velocity as shown by velocity curve 165. Since the forward drive signal 163 is not applied simultaneously with the removal of the reverse drive signal 171, but insead is delayed, the magnetic card medium comes to complete rest for a very short time duration. This brief pause is to insure proper card acceleration and velocity dynamics during the next subsequent subcycle.

During the fourth subcycle, the magnetic card medium is moved in a forward direction and the character to be recorded is recorded on the magnetic medium. Thus, after the delay described above, the forward drive signal is applied to the forward drive magnet and armature assembly of FIG. 1 thereby causing the card to accelerate as shown by velocity curve 165 to a constant forward velocity of five inches per second. Thereafter, the first bit of the previously recorded character passes under the read gap of the magnetic head assembly followed by the sync bit 169. The sensing of the sync bit gates the data signals of the character to be recorded to the magnetic head assembly. Thereafter, the current in the write coil of the magnetic head assembly fluctuates in accordance with the character to be recorded. This signal is represented by write signal 173. It is to be noted that the first bit of write signal 173 corresponds in time to the occurrence of the sync bit 169 of the read signal. As previously mentioned, any binary bit of the read signal 167 could be utilized as the sync bit. In the system described, the third flux reversal was utilized in order to insure against the possibility of synchronizing on spurious noise signals. Logic circuitry as described in the aforereferenced copending application of Cecil Wayne Cox and Frederick T. May filed concurrently herewith rejects such spurious noise signals and detects the third flux reversal of a data character prior to initiating a gating signal to the writing circuitry.

Referring once again to FIG. 2 of the specification and particularly to motion diagram 4 thereof, it can be seen that the distance between the leading edge of character 147 and character 159 is equal to the width of the character 147 plus erased areas 149 and 153. For purposes of illustration, assume that the first data bit of the charatcer 147 causes the recording of the first data bit of the character 159. Thus, as the first data bit of character 147 was passing under read gap 59, the first data bit of character 159 would be recorded by write gap 61 on the magnetic card medium 15. Hence, the sum of the width of the character 147 and the erased areas 149 and 153 equals the distance between read gap 59 and write gap 61. Within a given machine, this distance is, of course, a constant. It is also possible to control this distance within a very close tolerance when manufacturing a plurality of machines so that the magnetic card medium may be transferred from one machine to another without adverse effect.

In determining the intergap distance, it must be recognized that in order to record a vast plurality of characters on a single track of the magnetic card medium, it is necessary that the intergap distance be kept to a minimum distance. An increase in the intergap distance only increases the erased area between characters thereby decreasing character density. However, it must be remembered that the intergap distance must be sufficient to allow the card to accelerate to its constant recording velocity prior to recording the character. This is particularly true in the system described wherein write current is continuously applied to write coil 139, thereby precluding the possibility of moving the previously recorded character under the write gap 61 once is has been recorded. One could, however, carefully control turn-off to the write amplifier to insure that the previously recorded character is not erased when passing under the write gap 61 in either a backward or forward direction. While such an operation is entirely possible for high density recording, care must be taken to gate out a signal which would appear between the characters due to the switching on and off of current in the write coil 139.

It has been found that a character density of approximately 16 characters per inch can be achieved by utilizing an intergap spacing distance of .062 of an inch between a read gap of .025 inch by .00025 inch and a write gap of .058 inch by .001 inch. Additional factors which determine the intergap spacing include the decelerate distance and the recording frequency.

OPERATION

Referring once again to FIG. 1 of the specification, the magnetic card medium 15 is inserted under guide 26 and within guide slot 25. The insertion of the card transfers a switch (not shown) which effectuates downward motion of idler wheel 29 against the magnetic card medium forcing the magnetic card medium against the continuously rotating drive roller 35. The card is then moved in a high speed direction until it partially covers hole 79 which thereby provides a signal to light sensitive device 81 which in turn causes idler wheel 29 to move in an upward direction away from the card thus causing the card to stop its motion in the direction of arrow 19. Simultaneously, the magnetic head assembly 57 can be moved to the desired recording track by the selective operation of clutch 73. Thereafter, the card will increment in the direction of arrow 20 for each character serially recorded until the clutch 73 is selectively actuated to move magnetic head assembly 57 to another track. At this time, idler wheel 29 once again engages the magnetic card medium 15 and moves it until light-sensitive device 81 again provides a signal indicating that the card has reached its initial recording position. This operation is described in greater detail in the aforereferenced copending application of Robert A. Kolpek, Ser. No. 623,053.

The description which follows will describe the general case for recording data characters wherein a character has previously been recorded. However, it should be noted that the first data character on a track is not preceded by a previously recorded character. Thus, it is necessary to supply a signal to initiate the recording of the first character. The signal may be applied by a card position sensing device such as the light-sensitive device 81, or as described in the aforereferenced application of Donald J. Morrison and Howard C. Tanner filed concurrently herewith.

Assuming that a character has previously been recorded and that it is desirous to record the next subsequent character, start record circuit 109 supplies a signal which resets the $T_1$ status latch circuit 101 and sets the $T_2$ status latch circuit 103. Setting of the $T_2$ status latch circuit 103 provides a signal to forward control circuit 113 which in turn provides a signal to the coil 45 of the magnet and armature assembly 43 thereby causing armature 47 to move in a downward direction. Downward motion of armature 47 causes corresponding downward motion of shaft 9 against the action of spring 51 which causes the idler wheel 31 connected to the shaft to move against the magnetic card medium 15 driving the magnetic card medium against the continuously rotating drive roller 37. This action causes the magnetic card medium 15 to move in the direction of arrow 20 and the previously recorded character to move under read gap 59. As the previously recorded character moves under read gap 59, it is sensed by the read amplifier circuit 115 which provides an output signal to error detection circuitry (not shown) and to the data bit counter 117. The data bit counter 117 indicates when the complete previously recorded character has passed under read gap 59 and supplies an output signal which resets the $T_2$ status latch circuit 103 and sets the $T_3$ status latch circuit 105. The removal of an output signal from the $T_2$ status latch circuit 103 causes the forward control 113 to remove the signal from the coil 45 of magnet and armature assembly 43. The spring 51 then returns the idler wheel 31 to its initial position out of contact with the magnetic card medium 15.

When $T_3$ status latch circuit 105 is set, an output signal is provided to reverse control circuit 121 which effectuates downward motion of idler wheel 27 against the continuously rotating drive roller 33 in a manner similar to that described above with respect to the movement of idler wheel 31 under the control of the forward control circuit 113. Since drive roller 33 is rotating in an opposite direction from drive roller 37, the magnetic card medium 15 is moved in the reverse direction of arrow 19 and the character previously recorded again passes under read gap 59 in an opposite direction from its previous pass. The first data pulse of the previously recorded character sensed by read amplifier 115 sets time-out circuit 123 and each succeeding data pulse causes time-out circuit 123 to remain set. After the last such data pulse of the previously recorded characters is received, and since no subsequent pulses will be available to keep the time-out circuit 123 in a set condition, the time-out circuit will reset, thereby providing a signal to time delay circuit 125. This delayed signal from the output of time delay signal 125 is then applied to reset the $T_3$ status latch circuit 103 and to set the $T_4$ status latch circuit 104. Resetting of the $T_3$ status latch circuit effectuates the removal of the idler wheel 27 from the magnetic card medium 15.

At a predetermined time after the setting of the $T_4$ status latch circuit 107 as determined by time delay circuit 127, a signal is applied by the forward control circuit 113 to coil 45 once again initiating forward movement of the magnetic card medium 15 in the manner described above. As the magnetic card medium moves in the forward direction of arrow 20, the previously recorded character once again passes under read gap 59. Since bit detection circuit 129 detects the sync bit of the previously recorded character and effectuates the gating out of data bits from data register 133 to the write amplifier 135. The output of the write amplifier is applied to the write coil (not shown) of the magnetic head assembly 57 thereby effectuating the recording of data bits at write gap 61 onto the magnetic card medium 15. Data bit counter 117 counts the data bits recorded and when a complete character has been recorded, supplies a signal which resets the $T_4$ status latch circuit 107 and sets the $T_1$ status latch circuit 101. Additionally, this signal is also supplied to reset forward control circuit 113 thereby immediately effecting the removal of the idler wheel 31 from the magnetic card medium. The data bit counter 117 also supplies a signal to reset the sync bit detection circuit 129.

As described above, each character recorded is recorded a fixed distance from the preceding character and thus its position is dependent only upon the position of the preceding character. This position dependent recording is effected without the utilization of separate timing tracks, signal providing means coupled to the mechanical drive, medium position sensitive devices, medium velocity sensitive devices, or extensive internal data clocking devices. Further, each character thus recorded is checked for error and various noise signals and data signals from previous medium utilization are eliminated.

The above description describes how information is recorded on the magnetic card medium 15. When it is desired to play back information, it is only necessary to increment the magnetic card medium 15 in the direction of arrow 20. This operation is similar to the second subcycle described above wherein the magnetic card medium is moved in a forward direction to check to insure that the previously recorded character was error free. During playback, the character so read during the forward movement of the magnetic card medium is gated to a register and thence to a utilization device such as a serial printer. Thereafter, card motion is halted until the next playback cycle is initiated.

Once information has been recorded on the magnetic card medium, it is often desirous to change certain portions or characters of the information without necessitating re-entry of the entire block of information. For example, in a serial recording machine such as that described in the aforereferenced copending application of R. A. Kolpek, Ser. No. 623,053, information to be recorded on the magnetic card medium is entered serially from a keyboard. Since the keyboard operator may commit errors which are undetected at the time of the recording but which could be corrected by the mere replacement of a single character or group of adjacent characters, and further, since it is undesirous to have the operator rekey an entire line of information to correct such an error, it is necessary that the single "error" character be accessible for erasure and replacement. The recording system of the present invention is particularly adapted to precisely access any character, completely erase the undesired character, and replace it with the desired character without necessitating complex timing and/or positioning mechanisms.

For example, if it were desirous to replace the fifth character recorded on a particular track on the magnetic card medium 15 of FIG. 1 without affecting the information content of the fourth and sixth characters recorded on the same track and without necessitating the rerecording of either of these characters, the magnetic head 57 would firstly be positioned to the proper recording track. Thereafter, the first four characters may be played back a character at a time. The device may then be switched to record mode for recording the correct character to be entered from the keyboard entry device. Since the fourth character was played out which means that it has moved in the forward direction of arrow 20 past read gap 59 and since the fourth character is needed to position the to be recorded fifth character, it is necessary to back up the medium in the direction of arrow 19. Thus, when the mode is changed, logic circuitry (not shown) effects reverse motion of the medium similar to that effected during the third subcycle of a record cycle described above.

Thereafter, during the record cycle, the magnetic card medium 15 moves in the forward direction of arrow 20. The fourth character previously recorded passes under the read gap 59 and the fifth character previously erroneously recorded simultaneously passes under the write gap 61. Since erase current is continuously applied to the write coil (not shown) the erroneously recorded character is erased as it passes under the write gap. Thereafter, the magnetic card medium 15 is incremented in a reverse direction of arrow 19 and thence in a forward direction of arrow 20. During the second forward increment, the previously recorded fourth character is sensed as it passes under the read gap 59 thereby gating on the record logic to record the desired character in a position dependent upon the position of the fourth character. At the end of the record cycle, the newly recorded fifth character is aligned between the read gap 59 and the write gap 61 and the sixth character previously recorded would be the next character to pass under the write gap 61. If it is desired to change the sixth character, another recording cycle can be initiated. However, if it is desired to leave the sixth character as previously recorded, and if the remaining information recorded upon the track is correct, the magnetic head assembly 57 may be incremented to another track, the card returned to its initial position for error correction, playback, or recording of that track. Whenever a track return is initiated, write current is, of course, terminated.

Thus, it has been seen how any character in a block of information can be precisely located and changed without affecting adjacent data characters. This positioning is effected without the utilization of separate timing tracks or external clocking devices. Additionally, it is achieved without necessitating complex internal clocking circuitry or the recording of extraneous clocking and synchronizing signals within the data track itself. Instead, each data character is utilized to essentially control the positioning of the succeeding data character.

In the above description, there has been described an incremental recording device. It is of course recognized by those skilled in the art that the incremental recording subcycles described above could be varied while still maintaining the position dependent recording scheme of the present invention. For example, instead of moving the medium in a forward, then reverse, then forward direction as described above, the medium could be incremented in a forward direction during the first subcycle and the data character could be recorded during that subcycle. Thereafter, the medium would again be incremented in the forward direction and the character just recorded could be checked for error. Thereafter, the medium would be incremented in a reverse direction to position the medium for a subsequent record cycle. In either instance, the sensing of the previously recorded character by the read gap 59 would initiate the recording of the character to be recorded at the write gap 61. Further, the error checking function could be performed during the reverse motion of the medium.

Additionally, it is possible to utilize the recording system of the present invention in a high speed recording mode. For example, a complete track of data information could be stored in a fixed storage device, such as a magnetic core memory device. The magnetic card medium would then be moved at a constant velocity in the direction of arrow 20. As each character previously recorded passed under the read gap 59, the character following it could be recorded at the write gap 61, thereby insuring precise positioning of each data character with respect to the preceding character. Once a complete track of information has thus been recorded, the card could be moved at a constant velocity in the reverse direction of arrow 19. As each character passed under the read gap 59, it would induce signals which could be sensed by error detection circuitry to insure that the information has properly been recorded. Thereafter, the magnetic head assembly 57 could be incremented to a new data track for a subsequent track record cycle. Thus, when recording incrementally or continuously, the position of the previously recorded character controls the positioning of the character to be recorded thereby eliminating the necessity of external clocking devices or complex internal clocking arrangements. Once a character has been so recorded in either an incremental or a continuous record mode, it may be accessed by an incremental device for correction of a particular character or group of characters.

It is further recognized by those skilled in the art that the data character which generates the sync bit signal does not necessarily have to be adjacent to the character to be recorded but, instead, could be displaced for example by two character distances. In this manner, the inter-gap distance of the recording head may be made greater without decreasing character density, thereby providing better isolation of the read head from the write head by utilizing a greater quantity of separator material between the two heads. As greater magnetic isolation is achieved, simultaneous read-record operating could be effected thus enabling each data bit to be positioned by a previously recorded data bit.

Still another modification that may be made is to group a plurality of record heads together to effect simultaneous recording on a corresponding plurality of parallel tracks. A corresponding number of read heads could then be located a fixed distance from their counterpart record heads and the sensing of an information bit by a preselected one of or by any of the read heads could gate the write heads. Such a system could be used, for example, to effect serial by character and parallel by bit recording without necessitating the addition of redundant prerecorded timing information or expensive internal data clocking circuitry. In addition, if desired, a timing track could be recorded by one of the parallel record heads, the self-clocking method of the present invention being utilized to precisely position both data and timing information. Thereafter, the timing track could be utilized to gate out data signals during playback. Such a sysem would be of particular use with a non-return to zero (NRZ) data encoding system.

The above description has related to a magnetic recording system wherein the medium moves relative to the recording head. This system is equally applicable where the recording head moves relative to the medium and to recording systems other than magnetic medium recording systems, for example, optical systems utilizing light-sensitive recording medium.

While the invention has been particularly shown and described with reference to a preferred embodiment thereof, it should be understood by those skilled in the art, that the foregoing and other changes in form and detail may be made therein without departing from the scope of the invention.

What is claimed is:

1. An incremental recording and playback system comprising:

an information storage medium adapted to change state in accordance with information signals impressed thereon;

a recording station;

a reading station;

first means for effecting a first relative motion between said storage medium and said reading and recording stations over a path of travel in a direction that any preselected area of the medium that is first adjacent to said recording station travels said path toward a position adjacent said reading station, said path of travel being of constant distance;

first control means for actuating said first means for effecting said first relative motion upon initiation of a recording subcycle and for deactuating said first means upon completion of a recording subcycle;

recording means for impressing a predetermined plurality of information signals comprising a unit of information onto said storage medium at said recording station during said first relative motion;

sensing means for sencing previously recorded information signals at said reading station;

detection means responsive to predetermined signals of a previously recorded unit of information sensed by said sensing means during said first relative motion for providing an output gating signal;

gating means responsive to said output gating signal for effecting the impression of said unit of information by said recording means during said first relative motion;

second detection means responsive to said recording means for providing an output signal to first control means indicating the completion of a recording subcycle;

second means for effecting a second relative motion between said storage medium and said reading and recording stations over a path of travel in a direction opposite that effected by said first means for effecting relative motion;

second control means for actuating said second means for effecting relative motion upon initiation of a positioning subcycle and for deactuating said second means upon completion of a positioning subcycle;

third control means for actuating said first means for effecting said first relative motion upon initiation of an error check subcycle and for deactuating said first means upon completion of an error check subcycle;

third detection means responsive to said sensing means for detecting that a previously recorded unit of information has passed said read station during said second relative motion and for providing an output signal to said second control means indicating completion of a positioning subcycle;

fourth detection means responsive to said sensing means during said first relative motion of the error check subcycle for detecting that a previously recorded unit of information has passed said read station and for providing an output signal to said third control means indicating completion of an error check subcycle.

2. The incremental recording and playback system of claim 1 wherein:

said second control means being responsive to the output signal of said fourth detection means, said output signal indicating the initiation of a positioning subcycle;

said first control means being responsive to the output signal of said third detection means, said output signal indicating the initiation of a recording subcycle.

3. The incremental recording and playback system of claim 1 wherein an erase signal is supplied to said recording means and continuously impressed on said storage medium at all times other than when information signals are impressed thereby.

4. An incremental recording and playback system comprising:

an information storage medium adapted to change state in accordance with information signals impressed thereon;

a recording station;

a reading station spaced a fixed distance from the recording station;

actuatable first means for effecting relative motion between the storage medium and the reading and recording stations in a first direction so the medium is relatively displaced from the recording station toward the reading station;

actuatable second means for effecting relative motion between the storage medium and the reading and recording station in a second direction opposite said first direction;

actuatable recording means for impressing a predetermined plurality of information signals comprising a unit of information onto said storage medium during relative motion in said first direction;

sensing means for sensing previously recorded information signals at said reading station during relative motion;

error detection means for actuating said first means and responsive to said previously recorded sensed information signals for deactuating said first means after a previously recorded unit of information has been sensed, said error detection means indicating the presence of error;

repositioning means responsive to said error detection means for actuating said second means upon the deactuation of said first means to place said sensed unit of information intermediate said recording and reading stations, and for deactuating said second means;

entry means for actuating said first means for a record cycle;

gating means responsive to a predetermined sensed signal of a previously recorded unit of information sensed by the sensing means during relative motion in said first direction for actuating said recording means during a record cycle.

5. The incremental recording and playback system set forth in claim 4 wherein;

said repositioning means is further responsive to said sensing means for deactuating said second means after a complete unit of information has been sensed during relative motion in the second direction.

6. The incremental recording and playback system set forth in claim 4 wherein an erasing signal is supplied to said recording means and impressed on said storage medium at all times other than when information signals are impressed thereby.

References Cited

UNITED STATES PATENTS

| | | | |
|---|---|---|---|
| 2,975,407 | 3/1961 | O'Brien | 340—174.1 |
| 3,136,465 | 6/1964 | Comstock | 346—74 |
| 3,444,541 | 5/1969 | Irwin | 340—174.1 |
| 3,395,405 | 7/1968 | Cummings et al. | 340—174.1 |

BERNARD KONICK, Primary Examiner

W. F. WHITE, Assistant Examiner

U.S. Cl. X.R.

179—100.2